US006430247B1

(12) United States Patent
Mourlevat et al.

(10) Patent No.: US 6,430,247 B1
(45) Date of Patent: Aug. 6, 2002

(54) METHOD AND SYSTEM FOR MONITORING AT LEAST ONE OPERATING PARAMETER OF THE CORE OF A NUCLEAR REACTOR

(75) Inventors: Jean-Lucien Mourlevat, Noisy le Roi; Norque Louedec, Paris, both of (FR)

(73) Assignee: Framatome, Courbevoie (FR)

( * ) Notice: Subject to any disclaimer, the term of this patent is extended or adjusted under 35 U.S.C. 154(b) by 0 days.

(21) Appl. No.: 09/598,710

(22) Filed: Jun. 21, 2000

(30) Foreign Application Priority Data

Jul. 5, 1999 (FR) .......................................... 99 08652

(51) Int. Cl.$^7$ .............................................. G21C 17/00
(52) U.S. Cl. ........................................ 376/254; 376/255
(58) Field of Search ................................. 376/254, 277, 376/249, 241, 255; 976/DIG. 238

(56) References Cited

U.S. PATENT DOCUMENTS

| 4,637,910 A | * | 1/1987 | Impink, Jr. ................. 376/216 |
| 5,024,801 A | * | 6/1991 | Impink, Jr. et al. ......... 376/217 |
| 5,406,598 A | | 4/1995 | Takeuchi et al. |

FOREIGN PATENT DOCUMENTS

| DE | 24 32 566 | 1/1975 |
| EP | 0 323 280 | 7/1989 |
| EP | 0 396 321 | 11/1990 |

* cited by examiner

Primary Examiner—Galen L. Barefoot
(74) Attorney, Agent, or Firm—Connolly Bove Lodge & Hutz LLP

(57) ABSTRACT

Neutron flux is measured using a subset of detectors (8) selected from a set of detectors (8) introduced into fuel assemblies (2) of the core (1) to obtain measurement signals, the number n of detectors (8) of the subset being at most equal to 15% of the number of fuel assemblies (2) in the core (1), the measurement signals are processed and the instantaneous distribution of the neutron flux in the core (1) is calculated allowing for the measurement signals. At least one operating parameter of the core is calculated from the instantaneous neutron flux distribution, and an alarm is triggered if at least one parameter is outside a fixed range. The operation of the core of the nuclear reactor can therefore be monitored virtually in real time. The neutron flux detectors (8) introduced into the fuel assemblies of the core preferably include measuring probes consisting of collectrons.

12 Claims, 3 Drawing Sheets

METHOD AND SYSTEM FOR MONITORING AT LEAST ONE OPERATING PARAMETER OF THE CORE OF A NUCLEAR REACTOR

FIELD OF THE INVENTION

The invention relates to a method and system for monitoring at least one operating parameter of the core of a nuclear reactor and in particular a pressurized water reactor.

BACKGROUND OF THE INVENTION

Nuclear reactors such as pressurized water reactors have a core consisting of fuel assemblies which are generally straight, of prismatic shape and juxtaposed with their longitudinal axis vertical, i.e. in the direction of the height of the core.

It is essential to ensure at all times that the reactor is operating perfectly and in accordance with general safety conditions set by regulations and standards.

In particular, it is necessary to determine if the production and spatial distribution of the flow of neutrons and the spatial distribution of the power generated in the core conform to conditions corresponding to normal and satisfactory operation of the core.

This requires calculation of operating parameters of the core of the nuclear reactor, such as the spatial distribution of power in the core, the form factors of the neutron flux or the critical heating ratio. These parameters are determined by measuring the neutron flux in the core to determine the distribution of the neutron flux throughout the core in three dimensions.

The parameters characteristic of the state of the core in normal operation which are derived from the neutron flux measurements must not at any time be outside ranges determined during the process of designing the nuclear reactor.

It is necessary to trip an alarm and to implement various measures concerning the control of the nuclear reactor if any parameter characteristic of the operation of the core is found to exceed a limiting value.

For effective monitoring of the operation of the core of the nuclear reactor it is necessary to determine the operating parameters of the core and therefore the distribution of the neutron flux in the core in as short a time period as possible.

The neutron flux measurements in the core needed for continuous monitoring of the nuclear reactor in operation are generally provided by chambers outside the containment vessel of the reactor which are generally referred to as "excore" chambers.

These chambers include multiple measuring stages (for example six stages) distributed in the direction of the height of the core and are generally used to perform measurements in four areas at the periphery of the core of the nuclear reactor which are symmetrical about two axial planes of symmetry of the core at an angle of 90° to each other.

The staged excore detector chambers provide flux measurements at various heights in the core and in these four circumferential areas around the core. However, these external systems provide only approximate values of the neutron flux within the core and an approximate representation of the neutron flux distribution. Accordingly, the monitoring parameters are obtained in a relatively imprecise manner and, for safety reasons, greater margins must be provided for critical values of these parameters that must not be reached or exceeded.

To obtain a more exact representation of the neutron flux distribution within the core, additional neutron flux measurements are conducted within the core, at regular but relatively long time intervals, for example in the order of one month, using very small measuring probes, referred to as "incore" probes, which generally take the form of fission chambers. Each incore probe is fixed to the end of a flexible cable referred to as a teleflex cable for moving it inside a measuring channel of the instrumentation of the nuclear reactor. Each measuring channel opens at one end into an instrumentation area in the bottom part of the reactor building. The fission probes are moved inside the measuring channels from the instrumentation area. Each measuring channel includes a fuel assembly instrumentation tube inside the core of the nuclear reactor and a glove finger inside the instrumentation tube in which the fission probe moves. The neutron flux is measured in a set of fuel assemblies distributed throughout the section of the core.

In the case of a core with 177 fuel assemblies, 56 measuring channels are generally used, for example. Similarly, 58 measuring channels are used for a core with 193 fuel assemblies, 50 measuring channels for a core with 157 fuel assemblies and 60 measuring channels for a core with 205 fuel assemblies. The neutron flux measurements are carried out as the incore probes are moved at slow speed over the full height of the core. Many neutron flux measurement points closely spaced along the height of the core are obtained in this way. An image which is sufficiently representative of the neutron flux is obtained in the form of a flux map, given the distribution of the instrumented fuel assemblies within the core and the symmetry of the core. However, the incore probes consisting of the fission chambers cannot be used for very long periods inside the core of the nuclear reactor. An accurate flux map of the core is determined only from time to time and therefore cannot be used for continuous monitoring of the operation of the core of the nuclear reactor.

Also known in the art are neutron flux measuring probes which can remain in the core of a nuclear reactor throughout the operation of the nuclear reactor. These neutron flux measuring probes, which can take the form of "collectrons", are generally assembled in the form of measuring rods in a vertically aligned arrangement with a constant spacing between two successive probes, to constitute flux measuring detectors distributed throughout the height of the core of the nuclear reactor. Each rod is inserted into a glove finger normally used for measurements by a mobile probe and itself inserted into the instrumentation tube of a fuel assembly. Each of the flux measurement detectors or measurement rods, whose length is almost equal to the height of the core, can include eight measuring probes in the form of collectrons, for example.

In the case of a nuclear reactor core with 177 fuel assemblies, it has been proposed to place 52 measuring rods or detectors in 52 instrumented assemblies of the core of the nuclear reactor distributed throughout the section of the core.

An instrumentation system of the above kind, which has 8×52 measuring points distributed throughout the core, is able to provide an accurate three-dimensional image of the flux distribution in the core of a nuclear reactor.

However, given the response times necessary for monitoring the core of the nuclear reactor, processing neutron measurements produced by instrumentation remaining permanently in the core while the nuclear reactor is operating takes a long time, which is hardly practicable for monitoring operating parameters of the core.

Thus there is no accurate and fast method of obtaining the spatial distribution of the flux and of obtaining parameters for monitoring the core of the reactor from the flux distribution.

Nuclear power stations generally have a plurality of units or "tranches" each consisting of a nuclear reactor in a reactor building and conventional electrical power generation part. In this case, core monitoring concerns the nuclear reactor of each tranche.

BRIEF DESCRIPTION OF THE INVENTION

The object of the invention is therefore to propose a method of monitoring an operating parameter of the core of a nuclear reactor of a tranche of a nuclear power station consisting of a plurality of fuel assemblies juxtaposed along the height of the core using a set of neutron flux measuring detectors introduced into at least some of the fuel assemblies of the core and each including a plurality of fixed neutron flux measuring probes distributed along the height of the core, the method enabling fast and accurate determination of the flux distribution in the core, fast and accurate determination from the flux distribution of an operating parameter of the core, and substantially real time monitoring.

To this end, while the nuclear reactor is operating, at particular time intervals:

the spatial distribution of the neutron flux is measured using a subset of neutron flux detectors selected from the set of detectors introduced into the fuel assemblies of the core to obtain measurement signals, the number n of detectors of the subset being at most equal to 15% of the number of fuel assemblies in the core, a code for computing the neutron flux is used and account is taken of the measurements supplied by the subset of neutron flux detectors to obtain the instantaneous distribution of the, neutron flux in the core in the form of a set of values of the neutron flux at points distributed through the core, at least one operating parameter of the core is calculated from the instantaneous neutron flux distribution, and an alarm is triggered if at least one parameter is outside a fixed range.

In a first embodiment of the invention, to obtain the instantaneous neutron flux distribution throughout the core:

the spatial distribution of the flux in the core is calculated instantaneously on the site of the reactor from parameters from equipment of the tranche, using the neutron flux calculation code and in the form of a set of neutron flux values at points distributed through the core including a first subset of instrumented positions at which the n neutron flux measuring probes of the subset of detectors are situated and a second subset of non-instrumented positions, the differences between the measured flux values and corresponding values calculated from the parameters from the equipment of the tranche are computed for each instrumented position, corresponding differences are calculated for each non-instrumented position by extrapolation from the differences relating to the instrumented positions, and an algebraic value is added to the spatial flux distribution values obtained from the parameters from the equipment of the tranche to reduce the calculated difference at each of the points distributed in the core .

In a second embodiment of the invention, to obtain the instantaneous neutron flux distribution throughout the core:

the spatial distribution of the neutron flux inside the core is calculated instantaneously a first time, on the site of the reactor, from parameters from the equipment of the tranche, using the neutron flux calculation code and in the form of a set of neutron flux values at points distributed throughout the core including a set of instrumented positions at which the neutron flux measuring probes of the subset of detectors are situated, the differences between the measured values of the neutron flux and corresponding values calculated from the parameters from the equipment of the tranche are calculated for each instrumented position, the calculated differences are used to apply a correction to definition parameters of the neutron flux calculation code, and the instantaneous distribution of the neutron flux inside the core is calculated instantaneously a second time, on the site of the nuclear reactor, from the parameters from the equipment of the tranche and using the neutron flux calculation code including the corrected definition parameters.

In order to explain the invention, one embodiment of the method according to the invention will now be described by way of example and with reference to the accompanying drawings, in the context of a pressurized water nuclear reactor and its monitoring system.

DETAILED DESCRIPTION OF THE INVENTION

Figure 1:
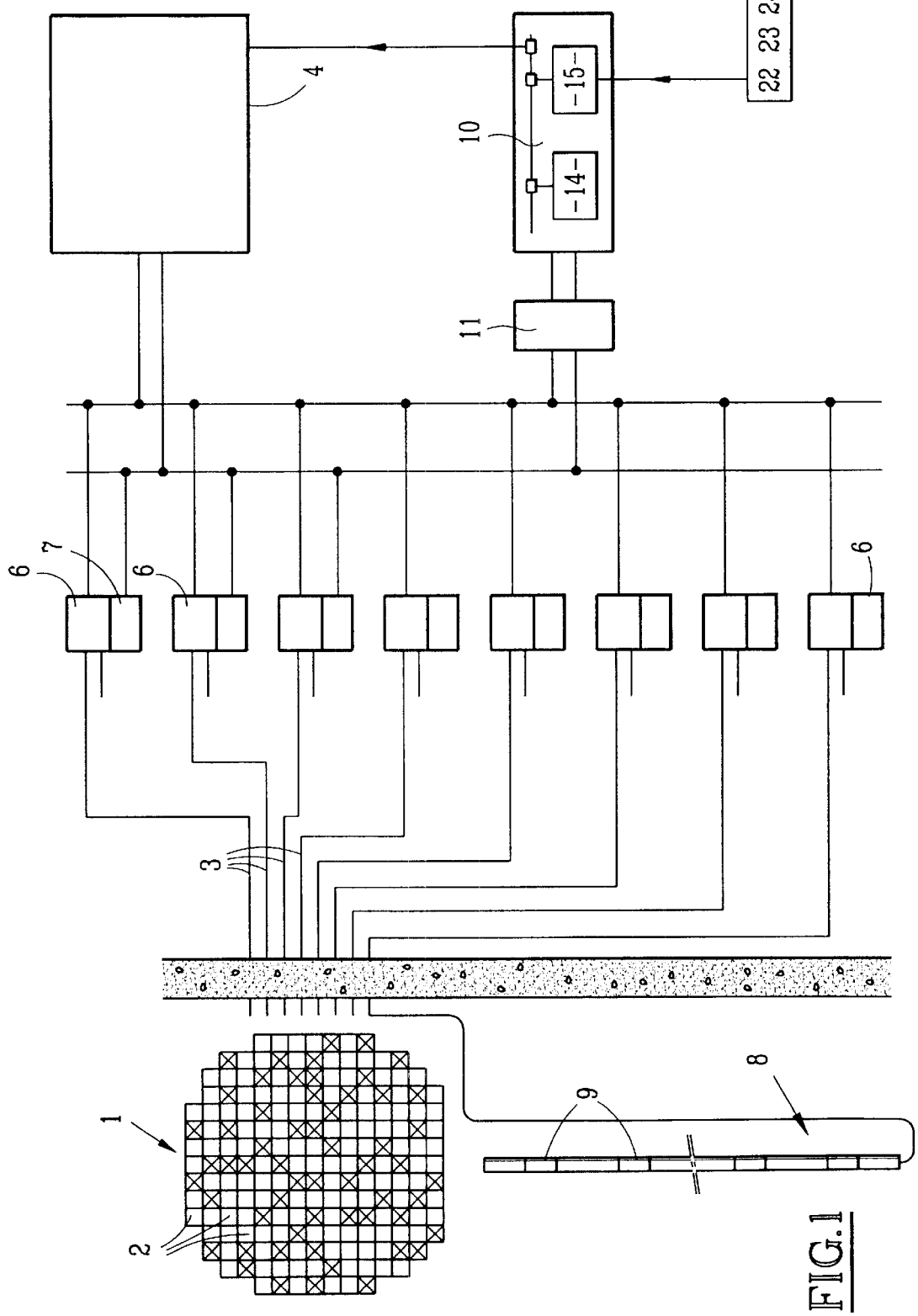
FIG. 1 is a diagram showing a monitoring system for implementing the method of the invention.

FIG. 1 shows a nuclear reactor in cross section on a horizontal plane through the core 1, the reactor comprising straight fuel assemblies 2 of prismatic shape with a square base disposed adjacent each other in the vertical direction of the core 1.

Some of the fuel assemblies of the core are instrumented fuel assemblies, i.e. fuel assemblies in which a neutron flux detector is introduced into a glove finger which is itself introduced into the instrumentation guide tube of the fuel assembly.

In the case of a nuclear reactor core 1 including 193 fuel assemblies, as shown in FIG. 1, 48 assemblies (marked with a cross) distributed across the section of the core are instrumented to implement the method according to the invention, for example.

The 48 instrumented fuel assemblies are each connected to one of 48 measuring channels 3 whose terminal part is the glove finger which is itself inside the instrumentation tube of the fuel assembly in which there is a fixed neutron flux detector or measuring rod. The detector incorporates a plurality of measuring probes distributed along its length and is introduced into the glove finger which is itself inside the instrumentation tube of the instrumented fuel assembly throughout the height of the core.

FIG. 1 shows, by way of example and on a larger scale, a measuring rod or detector 8 at one end of one of the 48 measuring channels 3. The detector 8 includes eight measuring probes 9 each consisting of a collectron and spaced from each other by a fixed distance along the length of the detector 8.

The collectrons 9 preferably include an emitter made from a material based on rhodium.

Each of the measuring channels 3 is connected at its end opposite the core of the nuclear reactor to a computer 4 in the computer room 5 of the nuclear power station. The computer 4 is the computer of the core internal instrumentation system, referred to hereinafter as the RIC (Reactor InCore) system.

The computer 4 is used to determine the three-dimensional distribution of the neutron flux inside the core from the measurement signals from the 48 measuring channels 3.

The monitoring system shown in FIG. 1 further includes eight junction boxes 6 for the measuring channels 3, to each of which eight measuring channels 3 are connected. Each of the boxes 6 includes a unit 7 for pre-processing the measurement signals.

To implement the invention 16 of the 48 measuring channels, and therefore 16 detectors 8, are chosen from the control room of the nuclear reactor using the computer, in order to enable fast processing of the measurement signals from the selected 16 measuring channels to determine, with a relatively short time period, the distribution of power within the core 1 of the nuclear reactor and operating parameters of the core, for virtually real time monitoring of the core 1.

To this end, the monitoring unit 10 is a computer into which data relating to the selected subset of detectors is loaded.

The measurement signals supplied by the 16 selected measuring channels are passed to a conditioning unit 11 which performs on-line acceleration of the signals representative of the neutron flux, in a manner described below.

The output signals from the conditioning unit 11 enter the monitoring unit 10 for determining the neutron flux and power distribution in the core of the nuclear reactor, computing the operating parameters of the core of the nuclear reactor and comparing those parameters to limiting values.

Figure 2:
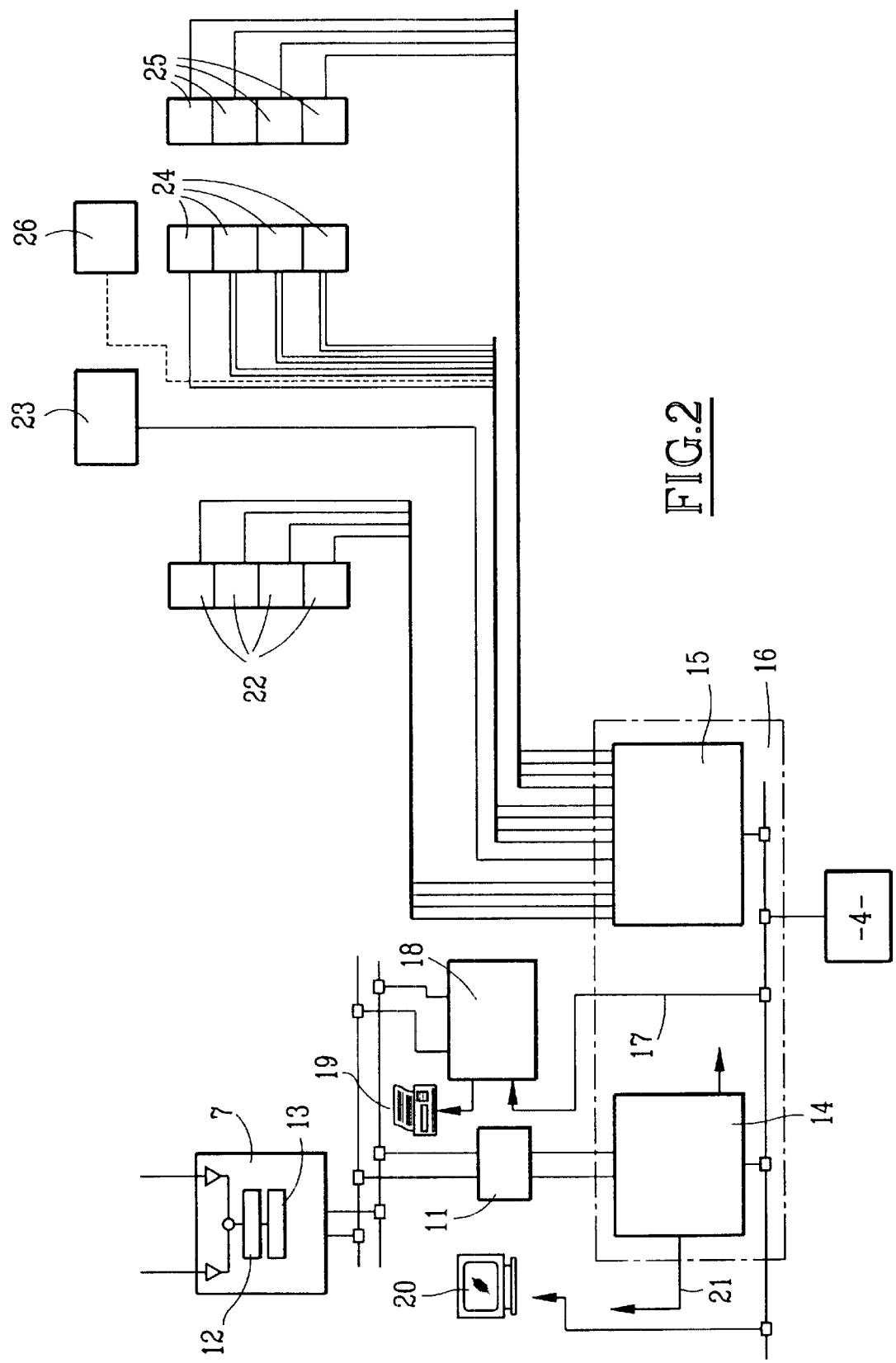
FIG. 2 is a diagram showing some of the measurement signal processing means and monitoring means of the system for implementing the method according to the invention.

FIG. 2 shows a unit 7 for pre-processing the signals received by a unit 6 from six measuring channels each connected to a detector 8 equipped with eight neutron flux measuring probes consisting of collectrons which are distributed along the longitudinal direction of the detector 8 in the core inside a glove finger which is itself inside an instrumentation tube of a fuel assembly.

The pre-processing unit 7 receives the measurement signals from each of the measurement probes via a measurement wire and a control wire. In the pre-processing unit 7, and for each of the measuring probes connected to the pre-processing unit 7, the signal transmitted by the control wire is subtracted from the measurement signal transmitted by the measurement wire and the resulting measurement signal is filtered in an electronic filter 12. The filtered signal is digitized in an analogue-to-digital converter 13. The digital signal is transmitted via the conditioning unit 11 to a processing unit 14 of the computer 10 inside a cabinet 16 in the protective room of the nuclear power station, which also contains a unit 15 for acquiring control parameters of the nuclear reactor from the computer 10.

The principle of on-line acceleration performed within a conditioning unit 11 is explained below.

The measurement signal from the collectrons is obtained from three components of an electric current:

two components of the current are obtained by production of electrons by beta radioactive disintegration of the material of the collectron caused by the neutron flux in the core of the nuclear reactor; these two processes creating electric current have periods of approximately 60 seconds and approximately four minutes, respectively, in the case of a rhodium collectron;

the third component is associated with a process of creation of electrons by the Compton effect due to the secondary emission of gamma rays in the collectron caused by the neutron bombardment and by gamma radiation from the core, to which the collectron is exposed, this process of forming electrons and therefore electric current being very fast and in practice practically instantaneous.

The transfer function which determines the current emitted by the collectron as a function of the received neutron flux is known and the skilled person knows how to isolate the current component due to the Compton effect. The function which is the inverse of the transfer function, or any other mathematical process, is used to determine the neutron flux from the current generated by the fast process due to the Compton effect. This accelerates the response of the detector in determining the neutron flux, its response becoming practically instantaneous. In the system for implementing the method of the invention shown in FIG. 2 the neutron flux measurements are accelerated on-line within the conditioning unit 11 on the lines for transmitting signals to the processing unit 14. The processing unit 14 calculates from the digitized neutron flux measurement signals that it receives the neutron flux, the flux distribution and the power distribution in the core of the nuclear reactor, together with operating parameters of the core. By comparing operating parameters of the core of the nuclear reactor with limits defined during the process of designing the nuclear reactor, the processing unit 14 determines margins between the measurement parameters and their limit values and produces alarm signals if any of the parameters reaches a limit value.

The results of the computation performed by the processing unit 14 are transmitted over a line 21 to an alarm management system ("controbloc") of the nuclear reactor.

The calculation results relating to the flux and power distribution and to the core operating parameter margins and alarms are transmitted over a line 17 to a local archiving system (SAL) 18 in which the data is stored. The system 18 also receives data relating to the flux measurements from the pre-processing units 7. The system 18 is connected to a printer 19 for printing data in archive storage on demand.

As explained later with reference to FIG. 3, the processing units use the digitized neutron flux measurement signals to determine the spatial distribution of the neutron flux in the core in the form of a set of values of the flux at points distributed through the core, for example, in the case of a core with 193 fuel assemblies, at N points along the length of the instrumentation channels of each of the fuel assemblies, i.e. 193×N points, where N depends on the required accuracy.

The processing unit 14 is also connected to one or more screens 20 in the control room of the nuclear reactor to display the calculation results relating to the flux and power distribution and to the operating parameter margins. If an operating parameter of the core of the nuclear reactor reaches a particular limit, the processing unit 14 produces an alarm signal which is transmitted to the control room to trigger a visual alarm on one of the screens 20, an audible alarm or any other type of alarm.

The operating parameters of the core of the nuclear reactor which the processing unit 14 can calculate from the flux or power distribution in the core of the nuclear reactor generally include the following parameters:

the linear power (Plin), i.e. the power per unit length of the fuel elements in the core of the reactor, the critical heating ratio (REC), representing the heating of the fuel elements relative to the critical heating, the axial imbalance of the power of the core (Dpax), the azimuth imbalance of the power of the core (Dpaz), and the anti-reactivity margin (MAR).

The processing unit 14 calculates the values of the flux and the distribution of the flux in the core, substantially in real time, using three-dimensional neutron calculation software and neutron measurements from 16 detectors selected from the 48 flux detectors in the core of the nuclear reactor.

The processing unit calculates the operating parameters of the core and the margins from the power distribution.

Using a smaller selection of detectors to determine the distribution of the flux greatly reduces the processing time, which is of the order of 30 seconds if 16 detectors are selected. The measurements can then be-performed and the distribution of the flux in the core determined within a period of 30 seconds.

By way of comparison, if a standard set of detectors is used to determine the distribution of the flux and of the power of the nuclear reactor, for example 58 detectors distributed through the core, the processing time would be of the order of six minutes. Generally speaking, by using a set of selected detectors the invention performs the measurements and calculations to determine the distribution of the neutron flux in the core and various operating parameters of the core and their margin relative to limiting values within a period of the order of 30 seconds, and in all cases of less than one minute. Alarms are triggered if the operating parameters reach the limits.

The measurements and calculations performed within a period of less than one minute, and of the order of 30 seconds, for example, enable the flux distribution in the nuclear reactor to be determined practically in real time and the operation of the core to be monitored continuously.

As can be seen in FIG. 2, the measuring and processing means also include means for feeding the acquisition unit with parameter values from equipment of the tranche, which means are connected to the acquisition unit 15. Via units 22 referred to as digital magnitude transfer units (UTGN), the acquisition unit can receive data such as temperatures and pressures in the loops of the primary circuit of the nuclear reactor and the power level of the reactor as determined from an enthalpy balance.

The acquisition unit 15 also receives data on the position of various clusters for adjusting the reactivity of the core of the nuclear reactor via cluster position processing logic (LTPG) 23.

The acquisition unit, which is connected to modules 24 for general measurement of the core outlet temperature (KRG), also receives data relating to the temperature of the core. The core instrumentation (RPN) system 25 supplies the neutron power of the core. Finally, a boron measuring system 26 provides information on the concentration of boron in the cooling water of the nuclear reactor. All this data is processed and transmitted by the acquisition unit and enables display of the parameter values in the reactor control room and the provision of information on the operation and control of the nuclear reactor.

The processing of the parameters from the equipment of the tranche in the processing units (or computer) is described hereinafter with reference to FIG. 3.

The parameters from the equipment of the tranche, the operating parameters from the acquisition and processing units and the flux measurements are transmitted to the local archive system (SAL) 18 connected to the printer 19.

Figure 3:
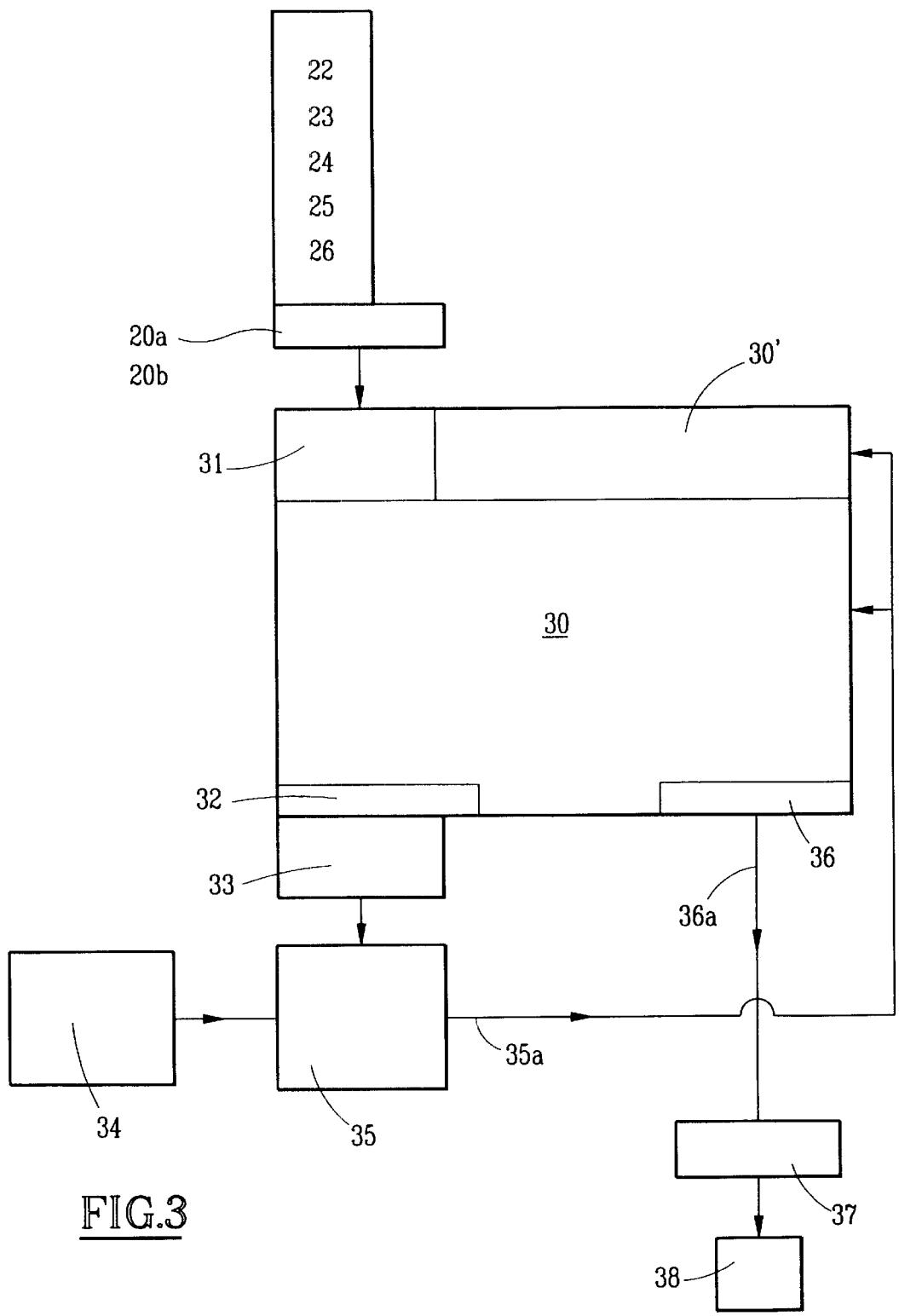
FIG. 3 is a functional block diagram illustrating the monitoring method according to the invention.

FIG. 3 is a functional block diagram of the three-dimensional neutron model 30 which is used for on-line (i.e. instantaneous) calculation, on the same site as the nuclear reactor, of the neutron flux distribution in the core of the nuclear reactor and operating parameters of the core such as the parameters Plin, REC, Dpax, Dpaz and MAR mentioned above.

The three-dimensional neutron model 30 is implemented in the form of software which is executed in a computer on the nuclear reactor site and which determines the spatial distribution of neutrons in the core in the form of a set of values of the neutron flux at points distributed throughout the volume of the core 1 of the nuclear reactor.

For example, in the case of a nuclear reactor having a core made up of 193 fuel assemblies disposed side-by-side, the neutron flux is calculated at eight points in the central instrumentation tube of each fuel assembly spaced at regular distances in the direction of the height of the core of the nuclear reactor.

The spatial distribution of the neutron flux in the core of the nuclear reactor therefore consists of a set of 193×N neutron flux values each associated with a position of a point in the core of the nuclear reactor, the number N being chosen according to the required accuracy.

Of the 193×N points distributed through the core, 16×8 points correspond to the positions of the neutron flux measuring probes constituting the subset of probes selected in accordance with the monitoring method of the invention, which are referred to as instrumented positions, and the remaining (193×N)−(16×8) positions are referred to as non-instrumented positions.

An input module 31 of the computer on which the neutron model 30 for performing the neutron flux calculations is implemented receives parameters from the equipment of the tranche as input data via the acquisition units 20a and 20b.

The parameters from the equipment of the tranche mentioned above are represented by the references 22, 23, 24, 25 and 26 of the measuring and processing units supplying the parameters to the acquisition units 20a and 20b.

The neutron model 30, based on the code for calculating the neutron flux at any point of the core, is parameterized by having the module 30' insert into the calculation code design parameters such as the enrichment of the nuclear fuel in the core and the concentration of xenon in the core.

The calculated values of the neutron flux, symbolized at 32 in FIG. 3, are transmitted to a calculated flux value selector unit 33 in each of the 16×8 instrumented positions.

The values selected by the unit 33 are transmitted to a comparator module 35 which also receives the neutron flux measurements performed by the collectrons and formatted in the corresponding conditioning units.

The module 34 represents all the acquisition and conditioning means for the neutron flux measurement signals.

The 16×8 measured values of the neutron flux are compared to the 16×8 calculated values in the comparator module 35, in which the difference between the calculated value and the measured value is calculated for each of the instrumented positions.

The result of the comparison, in the form of the calculated differences, is transmitted via the line 35a to the computer executing the calculation code based on the three-dimensional neutron model 30.

Two modes of processing the differences can be used.

In a first processing mode the differences calculated for each of the instrumented positions are processed by the computer which determines by extrapolation the corresponding differences for each non-instrumented position.

The differences for the points in the core corresponding to instrumented or non-instrumented positions are added algebraically to the flux values obtained by calculation from the parameters from the equipment of the tranche to obtain the measured value of the distribution of the flux at each point of the core.

A module 36 calculates at least one of the operating parameters mentioned above from these measured values. It transmits the calculated operating parameter(s) via the line 36a to a comparator unit 37 which sends a signal triggering an alarm device 38 in the event of a significant discrepancy between the value of the monitored parameter and a set point value.

In a second processing mode, the difference values are transmitted to the module 30' to modify the definition parameters of the calculation code in a direction which minimizes the differences between the measured and calculated values at each point corresponding to an instrumented position.

Determining the modifications to the definition parameters of the calculation code may necessitate successive operations of determining values of the neutron flux at the instrumented positions, varying the definition parameters of the calculation code and determining modifications which minimize the differences relative to the measured values.

This realigns the calculation code.

Finally, a second on-line calculation of the instantaneous distribution of the neutron flux within the core is performed on the basis of the parameters from the equipment of the tranche and using the neutron flux calculation code including the corrected definition parameters.

The value of each operating parameter of the core is determined from this instantaneous neutron flux distribution and transmitted over the line 36a to the comparator 37. An alarm is triggered in the event of a violation, as previously.

The parameters from the equipment of the tranche are obtained and transmitted to the computer within a relatively short time period, of the order of two seconds.

The values of the neutron fluxes at the various points, of the core constituting the spatial distribution of the neutron flux are calculated approximately every 30 seconds. If a more accurate instantaneous value of the spatial distribution of the neutron flux in the core is required, it is possible to calculate approximate neutron flux values representing the instantaneous spatial distribution of the neutron flux in the core in the nuclear reactor using the instantaneous value of each parameter from the equipment of the tranche, i.e. approximately every two seconds. This uses the calculation code in a simplified manner to modify the neutron flux values of the latest spatial distribution calculated from the instantaneous values of the parameters from the equipment of the tranche. It is thus possible to obtain a faster response for triggering an alarm, enabling a reduction of the power of the nuclear reactor to be commanded if necessary.

The protection system of the nuclear reactor enabling the reactor power to be reduced to zero for an emergency shutdown of the reactor includes the six-section multistage excore chambers outside the containment vessel of the nuclear reactor.

The protection system is calibrated once a month using the RIC instrumentation system.

Also, to determine a more accurate neutron flux map, measurements can be performed on the set of 58 detectors in the core at much longer periods than the period of the measurements using the selected set of detectors, for example once a day, rather than once a month in the case of mobile detectors. Thus the flux distribution determined in real time by the processing unit 14 can be periodically adjusted and realigned.

A neutron flux map is calculated by the RIC computer 4 using all the flux measuring detectors. The usual function of the computer 4 is to produce complete and accurate flux maps.

In the context of the invention, outside periods in which it is used for neutron flux calculations, the neutron model implemented on the RIC system computer can be used for calculations predicting the evolution of the core of the nuclear reactor and for simulations to assist with control, i.e. to define corrective action to be taken with regard to the control variables in the event of an alarm.

By providing the RIC computer 4 with a conditioning unit like the conditioning unit 11, it could be used as a back-up computer for implementing the method according to the invention if the calculation times are sufficiently short to comply with the monitoring set points.

Generally speaking, the triggering of an alarm must lead to corrective action on the control variables used to control the reactor, and to a reduction in the power of the reactor, for example, to repositioning of the clusters or to injection of boron or of diluting water into the cooling water of the nuclear reactor.

These actions can be determined in particular by the prediction calculations and simulations performed using the RIC system computer.

The method and the system of the invention therefore enable the power distribution in the core of the nuclear reactor and the operating parameters of the core to be determined very quickly, virtually in real time, and the parameters to be compared to obtain margins or to trigger alarms. Also, the power distribution in the core can be adjusted at relatively long time intervals, of the order of one day, but significantly less than the time intervals at which complete and accurate measurements of the neutron flux in the core are usually effected (of the order of one month in the case of mobile detectors).

The invention is not limited to the embodiment described.

The number of detectors selected for measuring and computing the neutron flux distribution in the core at particular short time intervals, less than one minute, can be other than 16, this number depending in fact on the number of fuel assemblies in the core and the speed of the computer. For implementing the method of the invention, the number of detectors selected must generally be less than 15% of the number of fuel assemblies in the core. In particular, for a core having almost 200 fuel assemblies, the number of detectors selected will always be less than 30.

The total number of detectors in the core, which was 48 in the example described, also depends on the total number of fuel assemblies in the core.

Because of the symmetry of the core, it is possible to determine the distribution of the detectors in one quarter of the core. The total number of detectors in the core is therefore generally a multiple of 4. In particular, that number can be of the order of one quarter the number of fuel assemblies.

For example, in the case of a core with 193 fuel assemblies, 48 detectors are used. The number of detectors selected for each measurement at particular short time intervals is generally of the order of one third the total number of detectors in the core, i.e. of the order of one twelfth the number of fuel assemblies in the core. As explained above, this number is more generally less than 15% of the number of fuel assemblies.

The neutron flux measuring detectors at fixed positions in the core generally comprise measuring sensors in the form of collectrons. Other types of measuring probe can also be used, provided that they can remain permanently in the core of the reactor in operation.

If collectrons are used, they preferably include an emitter made from a material based on rhodium, but it is also possible to use collectrons including an emitter made from a material based on cobalt. However, detectors with collectrons having an emitter based on cobalt are not suitable for the detectors of the set of detectors in the core used for flux measurements for determination of the neutron flux distribution by the RIC computer.

The use of detectors including collectrons based on cobalt must therefore be reserved to the sets of detectors used for continuous monitoring and protection of the core of the nuclear reactor and enabling the flux distribution in the core to be determined quickly. In this case, it is no longer possible to select a subset of detectors from all the detectors in the core to perform the measurements at short time intervals to monitor the core. Only a set of detectors including cobalt collectrons is then used for this purpose.

In the context of the invention, the period of the measurements and calculations providing the operating parameter(s) of the core can be less than one minute.

One of the main benefits of the invention is that it enables the operating margins of the nuclear reactor to be determined very quickly, with good accuracy, which improves the performance and efficiency of the nuclear reactor.

The invention applies to any nuclear reactor having a core into which flux measurement detectors can be introduced and remain in the nuclear reactor throughout its operation.

What is claimed is:

1. A Method of monitoring at least one operating parameter of a nuclear reactor core of a nuclear power station unit, the core having a number of juxtaposed fuel assemblies arranged over the height of the core, the process comprising the steps:

introducing a set of detectors, each having a string of spaced stacked detector units, into at least some of the fuel assemblies of the core for measuring neutron flux, the detectors being fixed and distributed over the height of the core;

during operation of the nuclear reactor, at specified time intervals:

a) measuring the spatial distribution of the neutron flux using a subset of neutron flux detectors selected from the set of detectors introduced into the fuel assemblies of the core to obtain measurement signals, the number of detectors of the subset being at most equal to 15% of the number of fuel assemblies in the core;

b) employing a neutron flux calculation code in conjunction with measurements provided by the subset detectors to obtain an instantaneous neutron flux distribution throughout the entire core in the form of a set of neutron flux values at points distributed throughout the core;

c) calculating at east one core operating parameter from the instantaneous neutron flux distribution; and d) raising an alarm if at least one operating parameter is outside a preselected range.

2. The monitoring process according to claim 1, together with the following steps to obtain the instantaneous neutron flux distribution throughout the entire core:

instantaneously calculating the spatial flux distribution inside the core, on the reactor site, and in the form of a set of neutron flux values at the various points distributed throughout the core, including a first sub-set of instrumented positions where the neutron flux measuring detectors are located and a second sub-set of non-instrumented positions, the instantaneously calculating being based on parameters originating from the power plant unit, using the neutron flux calculation code;

calculating, for each instrumented position, the difference between the flux values obtained by measurement and the corresponding values calculated from the parameters originating from the power plant unit;

extrapolating the corresponding differences for every non-instrumented position, from the differences relating to the instrumented positions;

algebraically adding a value to the spatial flux distribution values obtained from the parameters originating from the power plant unit, to reduce the calculated difference at each of the points distributed throughout the core.

3. The monitoring process according to claim 1, together with the following steps to obtain the instantaneous neutron flux distribution throughout the core:

instantaneously calculating, on the reactor site, the neutron flux distribution inside the core, in the form of a set of neutron flux values at the various points distributed throughout the core, comprising a set of instrumented positions where the neutron flux measurement detectors of the subset of detectors are located, the instantaneous calculating being based on parameters originating from the power plant unit, using the neutron flux calculation code;

calculating, for each instrumented position, the differences between the neutron flux values obtained by measurement and the corresponding values calculated from the parameters originating from the power plant unit;

the calculated differences being used to correct defining parameters of the neutron flux calculation code; and performing a second instantaneous calculation on the nuclear reactor site of the instantaneous neutron flux distribution inside the core based on the parameters originating from the power plant unit, using the neutron flux calculation code which includes corrected defining parameters.

4. The monitoring process according to claim 1, wherein the instantaneous values of the parameters coming from the power plant unit and current neutron flux values determined for every point in the core are used to calculate new instantaneous neutron flux values simply, using the calculation code.

5. The monitoring process according to claim 1, wherein at time intervals greater than the particular time intervals at which the measurements are performed using the subset of selected detectors, the greater time interval being generally one day, a neutron flux measurement is effected using the set of detectors introduced into the core of the nuclear reactor, an accurate neutron flux distribution being calculated in a nuclear reactor instrument system computer from the measurements, and the resulting neutron flux determination being realigned relative to an accurate neutron flux distribution determined by using the selected detector subset.

6. The monitoring process according to claim 5, wherein the computer is used outside periods in which it is used to determine an accurate neutron flux distribution in the core, to perform prediction calculations and simulations to define corrective actions to be taken on control variables of the nuclear reactor in the event of an alarm.

7. The monitoring process according to claim 1, wherein, the at least one operating parameter of the nuclear reactor core is chosen from the group of the following parameters: linear power density $P_{lin}$, critical heating ratio REC, power axial imbalance $D_{pax}$, power azimuthal imbalance $D_{paz}$, and anti-reactivity margin MAR.

8. The monitoring process according to claim 1, wherein conditioning processing of the measured signals from the detectors includes the steps of isolating, for each signal, an electric signal due to a phenomenon of fast electron production; and by applying an inverse transfer function, determining a neutron flux value from electric current isolated from the current signal.

9. An apparatus for monitoring at least one operating parameter of a nuclear reactor core of a nuclear power station unit, the core having a number of juxtaposed fuel assemblies arranged over the height of the core, the apparatus comprising:

- a plurality of detectors, each having a string of spaced stacked detector units, located in at least some of the fuel assemblies of the core for measuring neutron flux, the detectors being fixed and distributed over the height of the core;
- processing means connected at its input to the detectors for receiving measurements from a subset of the detectors, the subset including a number of detectors having a maximum equal to 15% of the number of fuel assemblies;
- the processing means determining flux and power distribution in the core and the at least one core operating parameter; and
- means for comparing the at least one operating parameter with at least one predetermined limit and for generating an alarm signal if the limit is met.

10. The system set forth in claim 9, wherein the detectors are connected to the processing means via a conditioning unit for on-line acceleration of obtaining measurement signals from the detectors.

11. The system set forth in claim 9, wherein the detectors comprise collectrons having an emitter made of a rhodium-based material.

12. The system set forth in claim 9, wherein the processing means has a back up unit for conditioning measurement signals.

* * * * *

UNITED STATES PATENT AND TRADEMARK OFFICE
CERTIFICATE OF CORRECTION

PATENT NO.    : 6,430,247 B1
DATED         : August 6, 2002
INVENTOR(S)   : Mourlevat et al.

It is certified that error appears in the above-identified patent and that said Letters Patent is hereby corrected as shown below:

<u>Title page,</u>
Item [75], Inventors "Norque Louedec" should be -- Monique Louedec --

Signed and Sealed this

Tenth Day of May, 2005

JON W. DUDAS
*Director of the United States Patent and Trademark Office*